April 14, 1970   H. R. BEURRIER   3,506,932
QUADRATURE HYBRID COUPLER
Filed Feb. 28, 1968   5 Sheets-Sheet 1

INVENTOR
H. R. BEURRIER
BY *Sylvan Sherman*
ATTORNEY

April 14, 1970   H. R. BEURRIER   3,506,932
QUADRATURE HYBRID COUPLER
Filed Feb. 28, 1968   5 Sheets-Sheet 3

April 14, 1970     H. R. BEURRIER     3,506,932
QUADRATURE HYBRID COUPLER
Filed Feb. 28, 1968     5 Sheets-Sheet 5

United States Patent Office 3,506,932
Patented Apr. 14, 1970

3,506,932
QUADRATURE HYBRID COUPLER
Henry R. Beurrier, Chester Township, Morris County, N.J., assignor to Bell Telephone Laboratories, Incorporated, Murray Hill and Berkeley Heights, N.J., a corporation of New York
Filed Feb. 28, 1968, Ser. No. 709,091
Int. Cl. H01p 3/08, 5/14, 5/12
U.S. Cl. 333—11
9 Claims

ABSTRACT OF THE DISCLOSURE

This application describes a lumped-impedance quadrature hybrid coupler comprising two congruent conductive strips each of which is bonded to a side of a dielectric insulator. In one embodiment of the invention, the strips are bonded to opposite sides of a common dielectric member. In another embodiment, the strips are bonded to different dielectric members.

Couplers of the type described are highly uniform, have very low loss and can be readily fabricated by a punching operation, or by printed-circuit techniques.

---

This invention relates to lumped-impedance quadrature hybrid couplers.

Background of the invention

Prior art lumped-impedance quadrature hybrid couplers, such as described in French Patent 1,489,380, comprise a pair of twisted wires whose capacitance and series inductance are tailored to produce a particular characteristic impedance and a particular power division ratio. While such couplers are small, efficient and relatively inexpensive, the technique of twisting, used to maintain the wires in proper registration, results in a number of practical problems which adversely affect the cost and performance of the these couplers. For example, since the capacitance of the twisted wire pair is a function of the thickness of the dielectric material separating the two wires, variations in the thickness of the insulation coating of either wire cause corresponding variations in the electrical characteristics of the coupler. In the course of manufacture, such unit-to-unit variations reduce the yield and, correspondingly, increase the cost of each coupler. A second difficulty relates to the fact that, after twisting, the ends of the wires must be physically separated, and then stripped of their insulation in order to make electrical contact to the couplers. This separation and stripping operation, which constitutes a separate step in the manufacturing process, has the undesirable effect of introducing a spurious lead-in inductance in series with the coupler which must be compensated for in order to maintain the desired coupler characteristics. Here again, the possibility of undesirable parameter variations from coupler-to-coupler is significant.

It is, accordingly, the broad object of this invention to reduce the cost and to improve the reproducibility of lumped-imepdance quadrature hybrid couplers.

Summary of the invention

In accordance with the present invention, high quality couplers are inexpensively and consistently obtained by means of printed-circuit techniques. In lieu of a pair of twisted wires, the coupler comprises two congruent conductive strips, each of which is bonded to a side of a dielectric insulator. In one embodiment of the invention, the strips are bonded to opposite sides of a common dielectric member. In another embodiment, the strips are bonded to different dielectric members. Such arrangements have numerous advantages. For example, the couplers can be fabricated using printed-circuit techniques or they can be quickly punched out of a conductively-clad insulator sheet in very large numbers. Since thin insulator sheets of uniform thickness can be readily obtained commercially, the couplers thus obtained are highly uniform. As the conductive strips are already bare and, hence, readily accessible, the separating and stripping operation is eliminated from the manufacturing process. In addition, contact can be made to the strips at any point along their respective lengths, providing additional flexibility in their utilization, as will be explained in greater detail hereinbelow. Finally, couplers in accordance with the present invention have losses that are typically an order of magnitude less than prior art twisted-wire couplers.

These and other objects and advantages, the nature of the present invention, and its various features, will appear more fully upon consideration of the various illustrative embodiments now to be described in detail in connection with the accompanying drawings.

Detailed description

Figure 1:
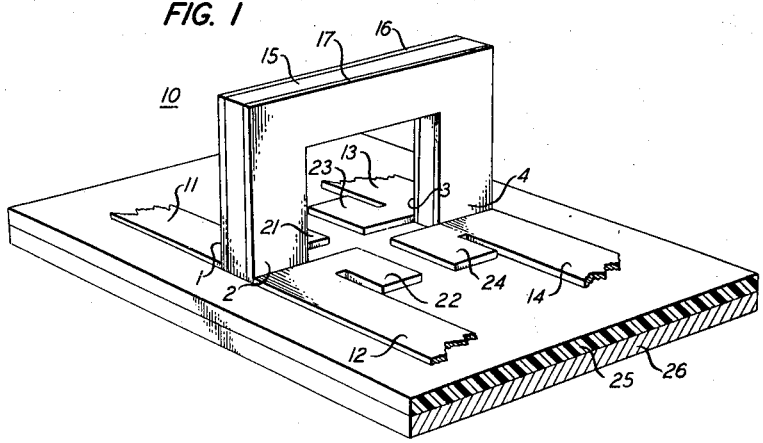
FIG. 1 shows a first embodiment of a quadrature hybrid coupler in accordance with the invention.

Referring to the drawings, FIG. 1 shows a first embodiment of a hquadrature hybrid coupler 10, in accordance with the invention, connected to four strip transmission lines. The term "quadrature hybrid coupler" is used in its accepted sense to describe a power-dividing network having four branches in which the branches are arranged in pairs with the branches comprising each pair being conjugate to each other and in coupling relationship with the branches of the other of said pairs. In addition, the coupled signal components are 90 degrees out of time phase, hence the designation "quadrature" coupler. Examples of such hybrids are Riblet (H. J. Riblet "The Short-Slot Hybrid Junction," Proceedings of the Institute of Radio Engineers, February 1952, pages 180–184), the multihole directional coupler (S. E. Miller, "Coupled Wave Theory and Waveguide Applications," Bell System Technical Journal, May 1954 pages 661–719), the semi-optical directional coupler (E. A. J. Marcatili, "A Circular Electric Hybrid Junction and Some Channel-Dropping Filters," Bell System Technical Journal, January 1061, pages 185–196), the strip transmission line directional coupler (T. K. Shimizu "Strip-Line 3 db Directional Coupler," 1957 Institute of Radio Engineers, Wescon Convention Record, vol. 1, Part 1, pages 4–15), and the lumped-element quadrature hybrids sold by Merrimac Research and Development, Incorporated, as advertised, for example, in the September 1966 issue of Microwave Journal.

Coupler 10, illustrated as U-shaped in FIG. 1, comprises an inner, low-loss dielectric member 15 and two, substantially identical, outer conductors 16 and 17. The latter are bonded to opposite surfaces of the dielectric material and are, thus, conductively insulated from each other. In practice, the coupler is most conveniently made from commercially obtainable sheets of conductively-clad insulator by a punching operation.

In this particular illustrative embodiment the coupler is mounted on an insulator 25 and the four branches 1, 2, 3 and 4 are connected, respectively, to conductive strips 11, 12, 13 and 14. The latter are elements of four strip transmission lines which comprise, in addition, insulator 25 and a common conductive ground plane 26.

Also included in FIG. 1, for reasons which will be more fully explained hereinbelow, are four short metallic strips 21, 22, 23 and 24 connected in shunt with the four transmission lines immediately adjacent to coupler 10.

Figure 2:
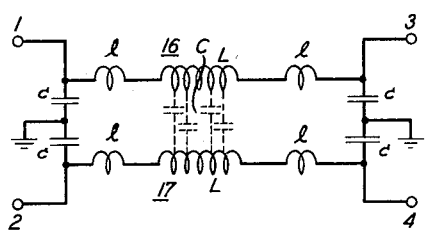
FIG. 2, included for purposes of explanation, shows an equivalent circuit of a lumped-impedance hybrid coupler.

Coupler 10 is a "lumped-impedance" type coupler. That is, the electrical distance between branches is a small fraction of a wavelentgh at the operating frequencies. Lengths of the order of one-eighth of a wavelength and less are typical. Thus, the equivalent circuit of the coupler can be represented by lumped-impedance elements as shown in FIG. 2. In this equivalent circuit, the self-inductance of each conductor 16, 17 is represented by an inductor of inductance L, conveniently measured by connecting the two inductors in parallel and doubling the measured inductance. Because of the close proximity of these two conductors and their coextensiveness, the mutual-inductance of the two conductors is approximately equal to the self-inductance of a single conductor. To the extent that the mutual inductance is actually slightly less than L, there will be some leakage inductance present which, in FIG. 2, is represented by four, equal inductors of inductance $l$ shown at the ends of conductors 16 and 17. The inductor-to-conductor capacitance, represented by the four dotted capacitors, is given as C. (It should be noted that since the coupler is a lumped-impedance coupler, the location of the various circuit elements in the equivalent circuit is arbitrary.)

It can be shown that the characteristic impedance, $Z_0$, of a hybrid of the type represented in FIG. 2 is given by $$Z_0 = \sqrt{L/C} \qquad (1)$$

and that the power devision ratio is equal to unity at a frequency, $\omega_0$, given by $$\omega_0 = \frac{1}{\sqrt{LC}} \qquad (2)$$

To compensate the leakage inductance, a capacitor $c$ added at each of the branches such that $Z_0 = \sqrt{l/c}$ and $$\omega_0 l = \frac{1}{\omega_0 c}$$

the illustrative embodiment, the compensating capacitance is provided by the four conductive strips 21, 22, 23 and 24.

In operation, a unit input signal coupled to branch 1 of coupler 10, divides into two quadrature components $\tilde{t}$ and $\tilde{k}$ in branches 3 and 2, respectively, where $$|\tilde{t}|^2 + |\tilde{k}|^2 = 1$$

Figure 3:
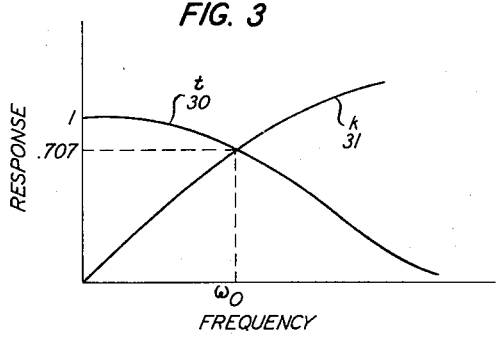
FIG. 3, included for purposes of explanation, shows the variations in amplitude of the transmitted and reflected signal components as a function of frequency.

The variation in amplitude of these two signal components, as a function of frequency, are represented in FIG. 3 by curves 30 and 31. Basically, the so-called transmission component $\tilde{t}$ is a maximum at zero frequency and decreases as the frequency increases. The so-called reflection component $\tilde{k}$, on the other hand, is a minimum at zero frequency, and increases as the frequency increases. the two components are equal in amplitude at the crossover frequency $\omega_0$. Mathematically $\tilde{t}$ and $\tilde{k}$ can be expressed by $$\tilde{t} = \frac{1}{1 + i\frac{\omega}{\omega_0}} \qquad (3)$$

$$\tilde{k} = \frac{\frac{\omega}{\omega_0}}{1 + i\frac{\omega}{\omega_0}} \qquad (4)$$

The power division is proportional to the square of the signal amplitudes, or $$|t|^2 = \frac{1}{1 + \left(\frac{\omega}{\omega_0}\right)^2} \qquad (5)$$

and $$|k|^2 = \frac{\left(\frac{\omega}{\omega_0}\right)^2}{1 + \left(\frac{\omega}{\omega_0}\right)^2} \qquad (6)$$

The power division ratio R is then $$R = \frac{|t|^2}{|k|^2} = \left(\frac{\omega_0}{\omega}\right)^2 \qquad (7)$$

Rearranging the terms in Equation 7 yields $$\omega_0 = \omega \sqrt{\frac{|t|^2}{|k|^2}} = \omega \sqrt{R} \qquad (8)$$

Equation 8 gives the crossover frequency as a function of the power division ratio and the operating frequency, and is used as the starting point in the design procedure. For example, by specifying the desired power division ratio and the operating frequency, $\omega$, the coupler crossover frequency, $\omega_0$, is given by Equation 8. Having determined the crossover frequency, the $L/C$ product is obtained using Equation 2. The product ratio $L/C$ is obtained from Equation 1 by specifying a characteristic impedance for the coupler. From these relationships, the coupler L and C are uniquely determined. Knowing that the capacitance C of a pair of parallel plates of area A, spaced apart a distance $d$, is given substantially as $$C = \frac{\epsilon A}{4\pi d}$$

and that the self-inductance L of a rectangular conductor is given as $$L = 0.00508a \left( 2.303 \text{ Log} \frac{2a}{(b+c)} + 0.5 + 0.2235 \frac{b+c}{a} \right)$$

where $a$ is the length of the conductor;
$b$ is the conductor width; and
$c$ is the conductor thickness, the physical dimensions of the coupler can be determined. Because of the complexity of the self-inductance expression, however, and because of approximations due to proximity effects, the practice has been to construct three or four couplers having the desired capacitance but different relative dimensions, and to measure the characteristic impedance of the coupler. Generally, from a plot of the impedance as a function of the coupler dimensions, the dimensions of a coupler having the desired impedance can readily be determined.

Figure 4:
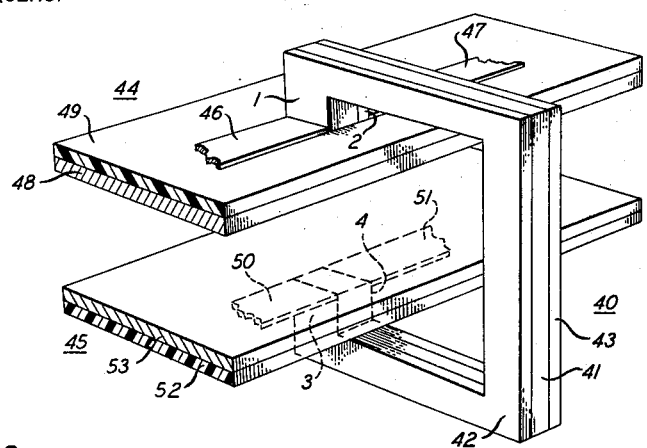
FIGS. 4, 5A and 5B show alternate embodiments of hybrid couplers in accordance with the invention.

There are two properties of a lumped-impedance coupler which make it particularly convenient to use. The first property is its substantial independence of any ground plane. Because of this, the coupler is convenient to use where the ground plane is poorly defined, or where it is necessary to go from one strip transmission line system having one ground plane to a second system having a different ground plane. (Though physically different, the ground planes are electrically connected, however.) The second property of interest relates to the fact that for all practical purposes, the coupler can have any shape. This, obviously, permits great flexibility in circuit design. FIGS. 4 and 5, now to be described, show various embodiments of couplers which illustrate how these two properties can be utilized. For example, FIG. 4 shows a ⊓-shaped coupler 40 comprising, as above, a center insulating member 41 and two outer conductive members 42 and 43. In this figure, coupler 40 is being used to couple between two different strip transmission systems 44 and 45. The upper of the two systems, 44, comprises the two conductive strips 46, 47 and a common ground plane 48 mounted on the opposite side of insulator 49. The lower system 45 comprises the two conductor strips 50, 51 and a common ground plane 53 mounted on the opposite side of insulator 52. Branches 1 and 2 of coupler 40 are connected, respectively, to the upper system strips 46 and 47, whereas branches 3 and 4 of coupler 40 are connected, respectively, to the lower system strips 50 and 51.

Figure 5A:
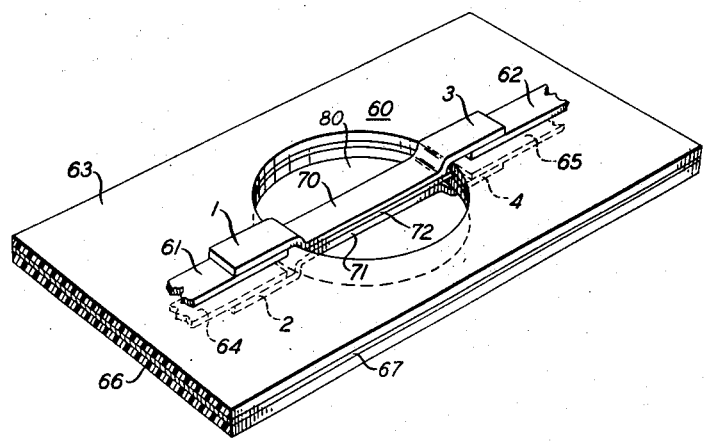

FIG. 5A shows a linearly-shaped coupler 60 being employed to couple between strip transmission lines located on opposite sides of a common ground plane. Thus, in FIG. 5A, the four strip transmission lines comprise strips 61 and 62 located on the upper surface of insulator 63, and strips 64 and 65 located on the lower surface of insulators 66. A common ground plane 67 is located between insulators 63 and 66.

Coupler 60, located in a hole 80 which extends through both insulators 63 and 66, and the common ground plane 67, comprises an upper conductor 70 which contacts conductive strips 61 and 62 at its respective ends 1 and 3, and a lower conductor 71 which contacts conductive strips 64 and 65 at its respective ends 2 and 4. The two coupler conductors 70 and 71 are separated by means of an insulator 72.

Figure 5B:
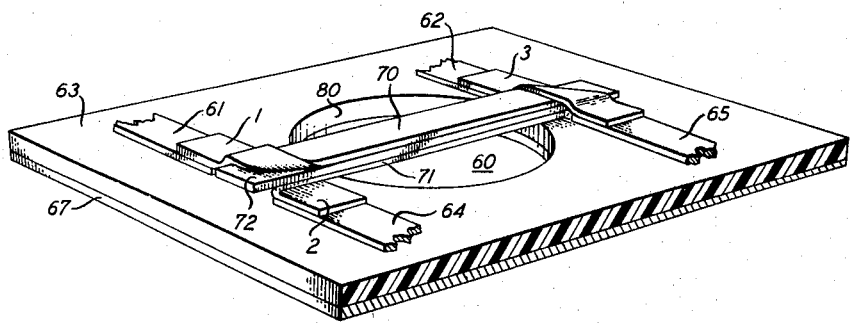

FIG. 5B shows the same coupler 60, and the four strip transmission lines 61, 62, 64 and 65 located on the same side of ground plane 67. The same identification numerals are used as in FIG. 5A.

Figure 6:
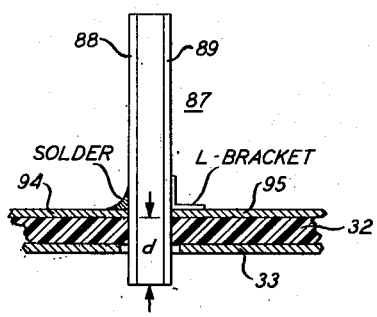
FIGS. 6 through 15 illustrate a variety of different ways of connecting couplers, in accordance with the present invention, to associated circuits.

FIGS. 6–15 show a variety of different ways of connecting a coupler to associated circuits. The simplest arrangements for more-or-less permanently connecting the coupler are illustrated in FIG. 6. In this embodiment the left conductor 88 of coupler 87 is soldered to transmission line 94 whereas the right conductor 89 is connected to transmission line 95 by means of a conductive L-bracket which is either pressed in position mechanically or is spot-welded in position.

FIG. 6 also illustrates an arrangement for increasing the coupler capacity. In this embodiment, both ends of the coupler extend a distance $d$ past the points of contact with conductors 94 and 95 through an aperture in insulator 32 and in ground plane 33. The extended portion increases the coupler capacitance without increasing the coupler inductance, thus providing an auxiliary control of characteristic impedance.

Figure 7:
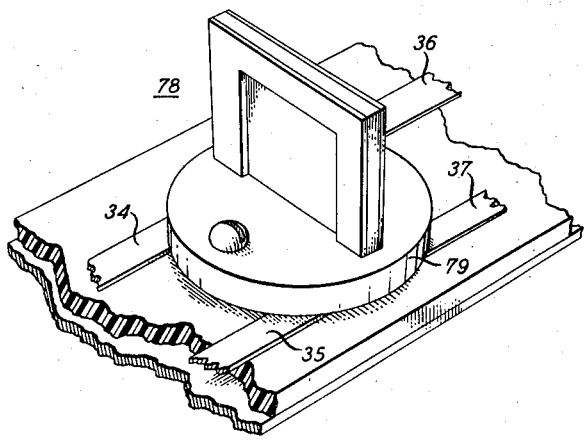

FIG. 7 illustrates the use of an insulated coupler receptacle used for holding coupler 78 and for connecting the respective branches of the coupler to transmission lines 34, 35, 36 and 37. The advantage of such an arrangement lies in that coupler 78 can be readily removed and replaced with a different coupler, as required. Contact between the coupler branches can be made in a variety of ways, two of which are illustrated in FIGS. 8–11.

Figure 8:
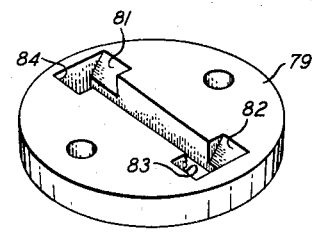
Figure 9:
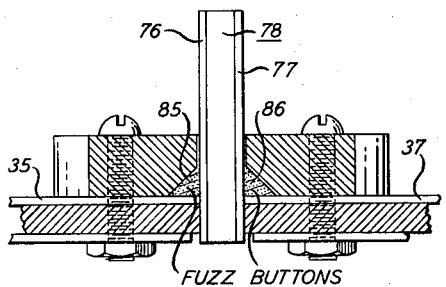

FIG. 8 shows the underside of receptacle 79 and, in particular, recesses 81, 82, 83 and 84. The recesses are designed to accommodate so-called "wedge fuzz buttons," which are balls of tangled wire. One button is inserted in each of the recesses. When the receptacle is bolted in position, as shown in FIG. 9, the buttons are compressed, making contact with both the coupler and the strip transmission lines. FIG. 9, which is a cross-sectional view of receptacle 79, shows fuzz buttons 85 and 86 compressed and making contact between opposite sides 76 and 77 of coupler 78 and the transmission lines 35 and 37, respectively.

Figure 10:
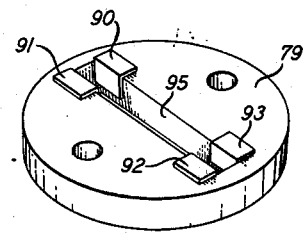

FIG 10 shows the use of metallic tabs 90, 91, 92 and 93 to make contact between the coupler and the transmission lines. As shown, each tab extends under the receptacle to contact a transmission line, and along the inner side of the receptacle aperture 95 to contact one branch of the coupler.

Figure 11:
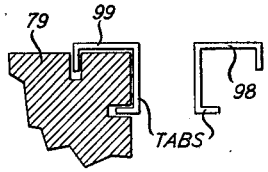

FIG. 11 shows a tab 98 by itself, and a tab 99 mounted in receptacle 79.

Figure 12:
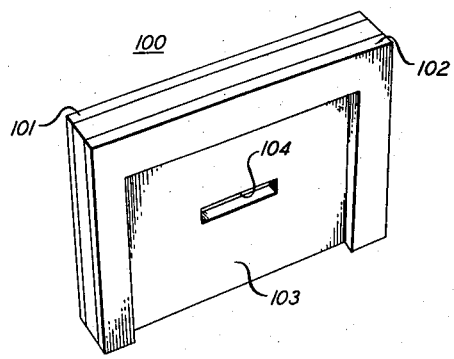
Figure 13:
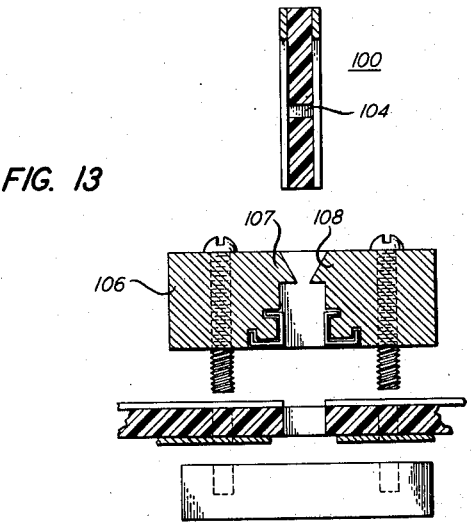

FIGS. 12 and 13 show a coupler and a mounting arrangement which includes a latching mechanism to insure that the coupler cannot be accidentally dislodged. The coupler 100, shown in FIG. 12, includes conductive strips 101 and 102 mounted on opposite sides of an inner dielectric member 103. A latching hole 104 is cut through the dielectric member.

FIG. 13 shows a cross-sectional view of coupler 100 and of a coupler receptacle 106 of the general type described in connection with FIGS. 7–11, modified to include two latching protrusions 107 and 108. When coupler 100 is inserted into the receptacle, the latching protrusions yield until they are aligned with aperture 104 in the coupler dielectric member. At this point the latches snap out and positively engage the dielectric member, thereby preventing the accidental dislodgment of the coupler from the receptacle. To remove the coupler, retractors are inserted to depress the latching protrusions, thus releasing the coupler and permitting it to be extracted.

Figure 14:
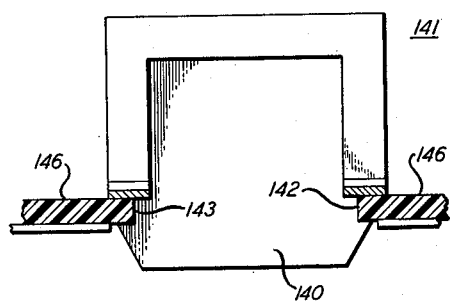

FIG. 14 shows an alternate latching arrangement wherein the latch is an integral part of the coupler. Thus, in FIG. 14, the dielectric member 140 of coupler 141 is provided with a pair of recesses 142 and 143 proportioned to receive the insulator portion 146 of the strip transmission lines to which coupler 141 is connected.

Figure 15:
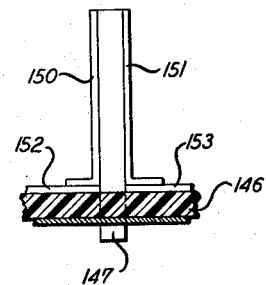

FIG. 15 is an end view showing coupler 141 inserted through a slot in insulator 146. FIG. 15 also shows an alternate method of making contact between coupler conductors 150, 151 and strip transmission line conductors 152, 153. Instead of using separate brackets as illustrated in FIG. 6, a portion of each of the conductors 150 and 151 is peeled off insulator 147, and either soldered or otherwise connected to the respective transmission lines.

It will be recalled from the discussion in connection with FIG. 1, that a signal applied to branch 1 of coupler 10 divides between branches 2 and 3. That is, the output signals are physically located on opposite sides of the coupler. It is, however, sometimes more convenient to have the two output signals appear on the same side of the coupler. This is arranged by constructing the coupler with a half-twist (i.e. 180 degrees) about an axis parallel to the long dimension of the coupler, as illustrated in FIGS. 16 and 17.

Figure 16:
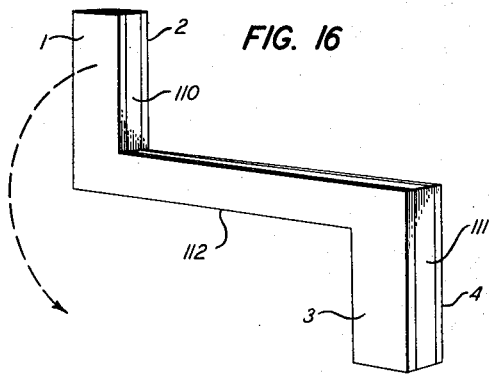
FIGS. 16 and 17 show a method of constructing a coupler with a half twist.
Figure 17:
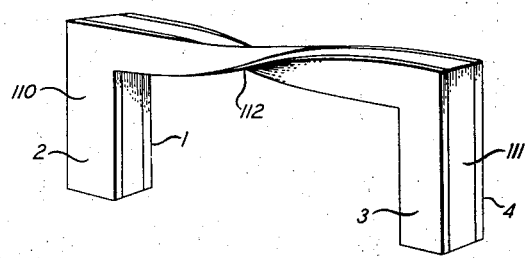

To realize a U-shaped coupler with a half-twist, the coupler is made as illustrated in FIG. 16, wherein opposite, parallel arms 110 and 111 of the coupler extend on opposite sides of the coupler center portion 112. One of the arms 110 is then twisted about an axis parallel to center portion 112 until the two arms are again parallel but on the same side of center portion 112, as illustrated in FIG. 17.

Figure 18A:
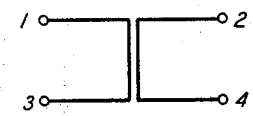
FIGS. 18A and 18B show the branch locations in couplers without a half twist and in couplers with a half twist.
Figure 18B:
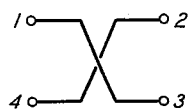

FIG. 18A shows the circuit diagram of a coupler without a half-twist, wherein branches 2 and 3 are located on opposite sides of the coupler. FIG. 18B shows the effect of the half-twist upon the location of branches 2 and 3.

In addition to reorienting the branches, it has been discovered that the losses associated with a coupler with a half-twist are of the order of one-third the losses of a comparable coupler without a twist. It is believed that the twisted coupler has lower radiation loss than the non-twisted coupler through effects similar to those which encourage the use of conductor transposition in power transmission lines.

In all of the couplers described heretofore, the conductive strips have been located on opposite sides of a common solid dielectric member. Typically, a dielectric material having favorable electrical as well as mechanical properties is selected. Among the electrical properties considered is that of loss. This is particularly important when it is realized that in a number of applications under consideration, it is contemplated that these couplers will number in the tens of thousands in large scale binary arrays. There are, however, materials that have favorable mechanical properties but unfavorable electrical properties. For example, some dielectric materials are good heat sinks but exhibit high loss. It would, therefore, be advantageous to provide some means whereby the principles of the present invention can be adapted to make use of these materials without experiencing, at the same time, the penalties associated with their unfavorable electrical properties. Such a coupler arrangement is illustrated in FIG. 19.

Figure 19:
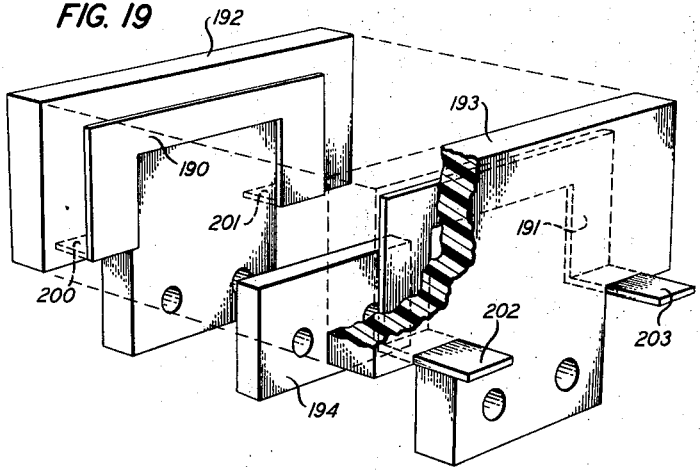
FIGS. 19 and 20 show an alternate embodiment of the invention in which each of the two coupler inductors are mounted on separate dielectric members.

In the embodiment of FIG. 19, the conductive strips 190 and 191 are mounted on adjacent surfaces of two separate dielectric members 192 and 193, respectively. In the particular instances where this type of structure was used, the dielectric material was chosen because of its relatively high coefficient of heat conductivity and was used as a heat sink for the coupler. However, inasmuch as this dielectric material was also characterized by a relatively high loss coefficient in contrast to the class of dielectric materials employed earlier, it was necessary that none of this material be located in the electric field between the two conductors. Advantageously, the dielectric between the conductors is air, which, in addition to its low loss, has a relatively low dielectric constant permitting the two conductors to be more closely spaced. The advantage of closed spacing lies in that it reduces the leakage inductance.

The conductor-to-conductor spacing can be maintained in a variety of ways. In the illustrative embodiment, a separate spacer 194 is included between members 192 and 193. Contact to the coupler is achieved by extending the ends of the conductors under the dielectric members forming contact tabs 200, 201, 202 and 203 which are soldered or otherwise connected to the external circuits.

Figure 20:
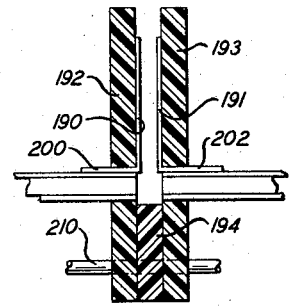

FIG. 20 shows the coupler assembled and also includes a water jacket 210 for forced cooling of the coupler. All other identification numerals are as in FIG. 19.

In all cases it is understood that the above-described embodiments are illustrative of but a small number of the many possible specific embodiments which can represent applications of the principles of the invention. As noted above, the coupler can have any shape. Thus, an endless variety of couplers can be devised to meet specific limitations of shape and size. In addition, the edges of the couplers can be chamfered where necessary to maintain a more uniform coupler impedance throughout. Thus, numerous and varied other arrangements can readily be devised in accordance with these principles by those skilled in the art without departing from the spirit and scope of the invention.

I claim:
1. A quadrature hybrid coupler comprising:
   first and second inductors each having an inductance L;
   said inductors being in coupling relationship with each other to form a capacitor of capacitance C such that the power division ratio for said coupler is unity at a prescribed angular frequency $\omega_0$; characterized in that:
   said inductors consist solely of two congruent, thin ribbon-like conductor elements whose electrical length is less than a quarter of a wavelength at said frequency $\omega_0$;
   and in that each of said conductors is bonded to the surface of a dielectric member.

2. The coupler according to claim 1 wherein said inductors are bonded to opposite sides of a common dielectric member.

3. The coupler according to claim 1 wherein said inductors are bonded to separate dielectric members.

4. The coupler according to claim 1 including, in addition, a receptacle for receiving said coupler and for connecting each end of said inductors to an external circuit.

5. The combination of coupler and receptacle according to claim 4 wherein said receptacle includes latching means for holding said coupler securely in place.

6. The combination of coupler and receptacle according to claim 4 wherein said receptacle includes means for connecting said coupler to four strip transmission lines.

7. The coupler according to claim 1 wherein said elements are twisted 180 degrees about an axis parallel to their long dimension.

8. The coupler according to claim 1 wherein contact is made to said coupler at corresponding points along both of said ribbon-like elements other than at their respective ends; said coupler then further characterized in that the total capacitance C of said coupler is a function of the total length of said elements, whereas the total inductance L of said coupler is a function of only the distance along said elements between said points of contact.

9. The coupler according to claim 1 wherein $$\omega_0 = \frac{1}{\sqrt{LC}}$$

References Cited

UNITED STATES PATENTS

| 3,452,300 | 6/1969 | Cappucci et al. | 333—10 |
| 3,452,301 | 6/1969 | Cappucci et al. | 333—10 |
| 2,854,645 | 9/1958 | Arditi | 333—97 |
| 2,951,218 | 8/1960 | Arditi | 333—10 |
| 3,063,026 | 11/1962 | McFarland | 333—11 XR |
| 3,345,585 | 10/1967 | Hildebrand | 333—10 |

OTHER REFERENCES

Saad: Microwave Miniaturization copyright 1966, Sage Laboratories, Inc., East Natick, Mass., outside front cover, inside front cover, and pp. 3–10 and 12.

Saunders and Stark: An Integrated 4 gHz Balanced Transistor Amplifier, IEEE Journal of Solid-State Circuits, vol. SC-2, No. 1, March 1967, pp. 4–10.

HERMAN KARL SAALBACH, Primary Examiner

M. NUSSBAUM, Assistant Examiner

U.S. Cl. X.R.
333—84, 97